United States Patent [19]

Ryu

[11] Patent Number: 5,091,813
[45] Date of Patent: Feb. 25, 1992

[54] TAPE CARTRIDGE WITH T-SHAPED BRAKING LEVER

[75] Inventor: Su S. Ryu, Chunwon-kun, Rep. of Korea

[73] Assignee: SKC Limited, Kiyongki-do, Rep. of Korea

[21] Appl. No.: 376,615

[22] Filed: Jul. 7, 1989

[30] Foreign Application Priority Data

Oct. 7, 1988 [KR] Rep. of Korea ............ 88-13106

[51] Int. Cl.$^5$ .............. G11B 15/32; G11B 23/04
[52] U.S. Cl. ............................ 360/132; 242/198; 206/387
[58] Field of Search ........... 360/132; 242/198-9; 206/387

[56] References Cited

U.S. PATENT DOCUMENTS

| | | | |
|---|---|---|---|
| 4,513,928 | 4/1985 | Hackett | 360/132 |
| 4,604,671 | 8/1986 | Oishi | 360/132 |
| 4,660,784 | 4/1987 | Sumich et al. | 360/132 |
| 4,671,469 | 6/1987 | Ikebe et al. | 360/132 |
| 4,719,529 | 1/1988 | Oishi et al. | 360/132 |
| 4,757,957 | 7/1988 | Nakatamari et al. | 242/198 |
| 4,774,617 | 9/1988 | Meguro | 360/132 |
| 4,969,611 | 11/1990 | Katagivi et al. | 360/132 |

FOREIGN PATENT DOCUMENTS 57-147172 9/1982 Japan ............................ 360/132

Primary Examiner—Aristotelis Psitos
Assistant Examiner—Alfonso Garcia
Attorney, Agent, or Firm—Kane, Dalsimer, Sullivan, Kurucz, Levy, Eisele and Richard

[57] ABSTRACT

Tape cartridge having a T-shaped brake lever or separable brake levers from the slider and forms needle-shaped ends at the ends of a T-shaped brake lever or separable brake levers and prevents the tape from being unwound by enabling the sawteeth parts to catch them but makes the positions of needle-shaped ends facing toward the sawteeth parts take their eccentric positions backward and inward contrary to the point where the former projections are located.

2 Claims, 2 Drawing Sheets

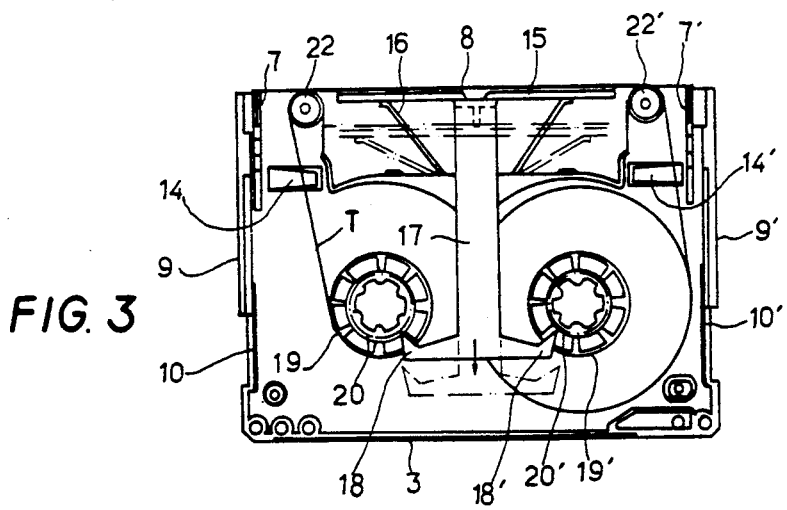
FIG. 3
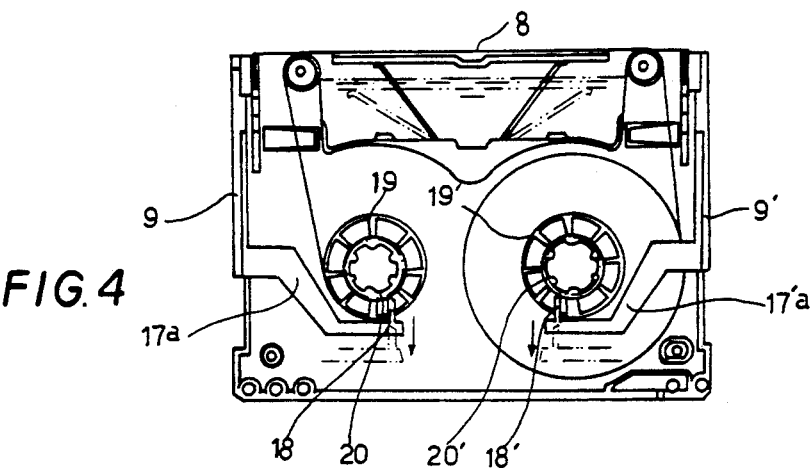
FIG. 4
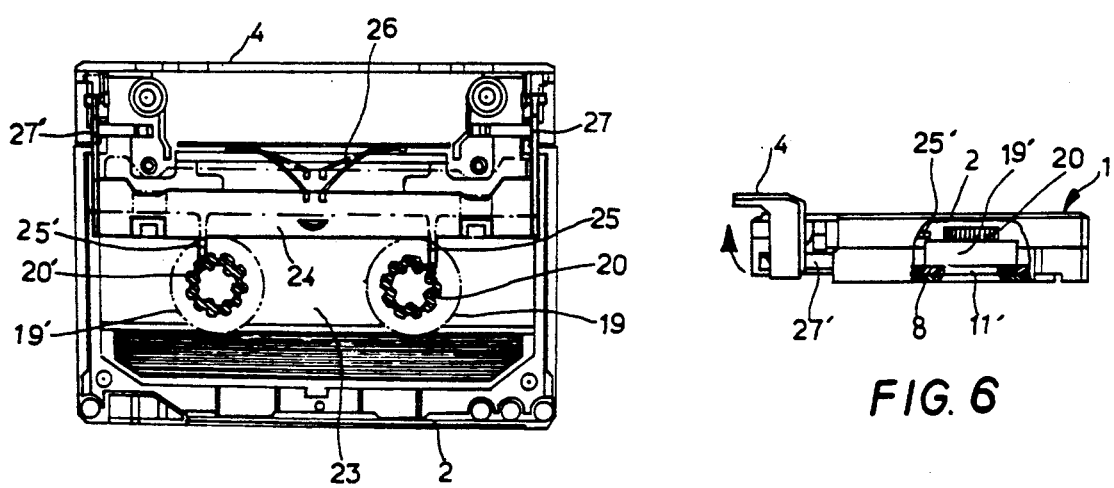
FIG. 5
FIG. 6

TAPE CARTRIDGE WITH T-SHAPED BRAKING LEVER

BACKGROUND OF INVENTION

A. Field of Invention

The present invention relates to a tape cartridge which aims to curtail the cost price remarkably by improving a means designed to prevent a tape from being unwound by the voluntary revolution of the tape hub when not in use in the case of tape cartridge which accommodates a digital signal-type audio tape.

B. Description of The Prior Art

Speaking of the generally known video tape cassette, it is assembled so well as to prevent its tape from becoming dusty and its tape reel is equipped with a locking means to prevent it from being damaged by the voluntary unwinding of tape when not in use. In the case of β-type cassette in particular, it is widely known that an opening/closing cover is provided in front of its case and, when the cover is opened, the closing means of its tape reel is released by mechanical linkage.

In the case of the audio tape, which also uses digital signals, it is so sensitive to dust and damage that the audio tape cartridge must also be prevented from becoming dusty and the brake means of tape hub and the opening/closing means of cover are used for it.

It is often desirable for the brake to be released only when the tape cartridge is completely united with the driving part on the side of the player, but it rises in cost price by being complicated in structure and intricate in assembly because a separate hub brake and an expensive spring are used.

SUMMARY OF THE INVENTION

It is the purpose of the present invention to simplify the structure of such a tape cartridge, to curtail its cost price and to make its assembly easier.

The hub brake member moves in the direction different from the direction to which the slider moves when it is released and the present invention came from my notion that it is not necessary to use a separate hub brake member and its spring importunately, if the brake means designed to catch the sawteeth part of hub is properly replaced by another means.

BRIEF DESCRIPTION OF THE DRAWINGS

Hereinafter, an explanation of the present invention will be given according to the drawings attached hereto.

The drawings illustrate a digital signal-type audio tape cartridge. In the first place an explanation of its general construction will be given.

FIG. 3 shows an inner plane view of the tape cartridge embodied by the present invention.

FIG. 4 shows an inner plane view of the tape cartridge by other embodiment of the present invention.

FIG. 5 shows an inner plane view of the tape cartridge according to the prior method.

FIG. 6 shows a side view of the important part which shows the operation of FIG. 5.

DETAILED DESCRIPTION OF THE PREFERRED EMBODIMENT

Figure 1:
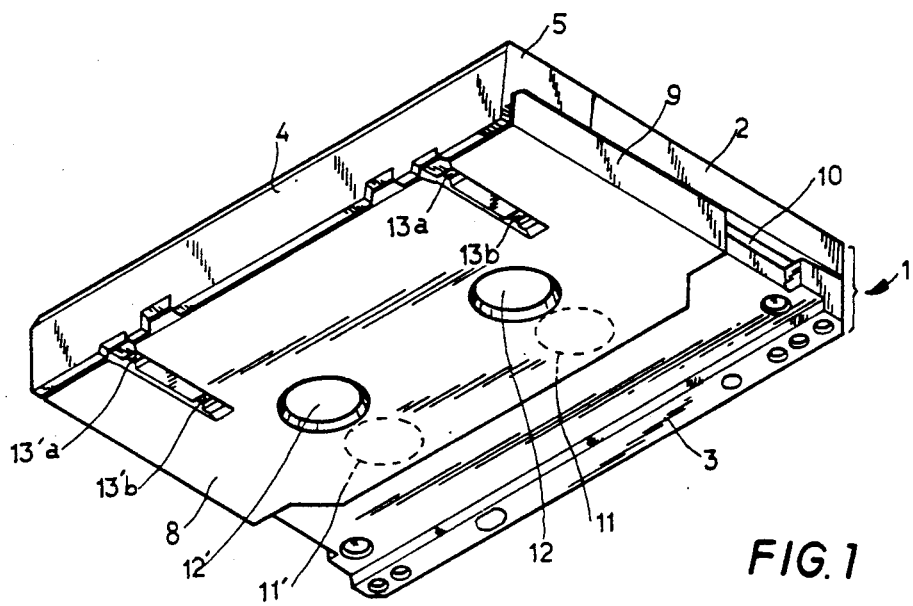
FIG. 1 shows a perspective view of the bottom of the tape cartridge, which is the subject of the present invention.

Briefly, FIGS. 5 and 6 show a prior art device which is illustrated for background. In this device sawteeth parts (20) (20') are formed and integrated with tape hubs (19) (19') as one body to face toward a transparent window (23) installed in the inner surface of the upper half shell (2) of the case(1) and a separate hub brake member (24) which assumes the required form is united with the frontal side of transparent window (23), but an expensive spring is inserted in it to enable its left and right projections (25) (25') to be caught by the sawteeth parts (20) (20') of tape hubs (19) (19'), and wing parts (27) (27') which are interlocked when a lead (4) is opened and are extended at both ends of hub brake member (24).

In such a tape cartridge as in use heretofore, a slider (8) is united therewith to prevent hub holes (11) (11') from being exposed when not in use, in addition to a separate hub brake member (24) and its spring (26). The slider (8) is designed to expose the above hub holes (11) (11') by moving backward when the tape cartridge is inserted into the side of player.

Accordingly, the said lead (4) is operable after the said slider (8) moves backward and the said hub brake member (4) releases the brake by being interlocked with the lead (4) as it is opened.

Figure 2:
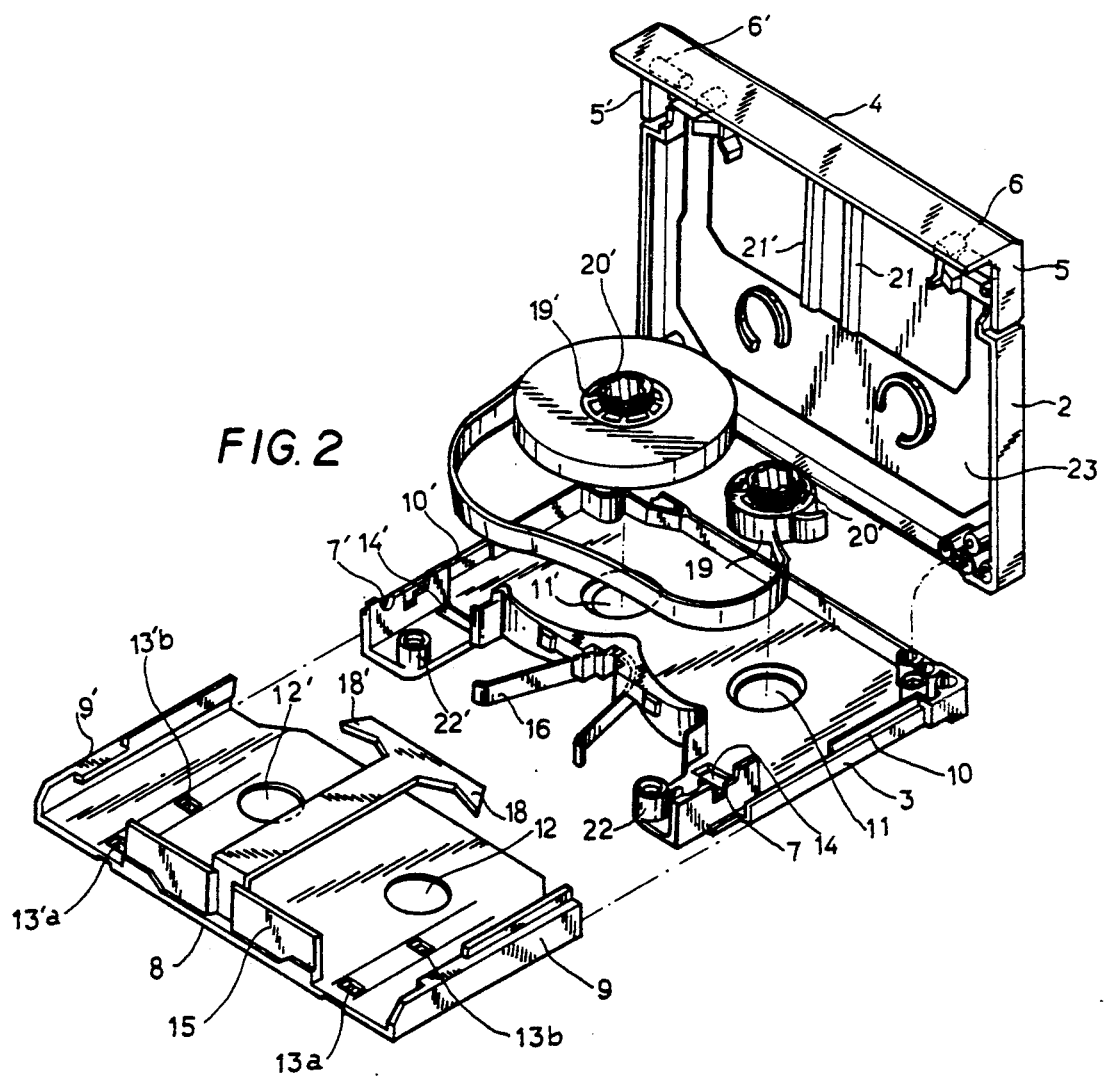
FIG. 2 shows a partial perspective view of the tape cartridge to which the present invention is applied.

Turning now to FIGS. 1 to 3 the case (1) of audio tape cartridge of the present invention is illustrated. The case (1) is composed of a plastic-made upper half shell (2) and a plastic-made lower half shell (3) which are united by several screws.

In front of the case (1) a cover called a lead (4) is installed. The lead has its both sides on a side plate (5) (5') which occupies a part of the said upper half shell (2) and forms

-shaped plane contour. On the side plate (5) (5') it has a projecting axis (6) (6'). As this projecting axis is supported by a supporting groove formed in halves in the upper and lower half shells (2) (3), the lead (4) opens upward at an angle of about 90° and closes.

As to the slider (8) at the bottom of lower half shell (3), its side walls (9) (9') are united with it so as to move forward and backward along the sliding grooves (10) (10') in the flank of lower half shell (3). This slider (8) has holes (12) (12') which open and close the hub holes (11) (11') of lower half shell (3) as it moves.

Also, the slider (8) has a pair of catching grooves (13a) (13b) which leave a required forward/backward space on both sides of its bottom. In one of these grooves, the elastic projection (14) (14') which is made by sparing a part of the lower half shell (3) is caught. Accordingly, the movement of slider (8) is limited by a stroke given for a forward/backward space left between a pair of catching grooves.

In the present invention however, the frontal wall (15) of the said slider (8) elastically holds the free end of spring piece (16) supported in the said lower half shell (3) and protects the backside of a part of the tape (T) and the frontal lead (4) together when not in use.

This frontal wall (15) has a T-shaped brake lever (17) extending from its central upper part into the inside of the case just in the rear and both ends of this brake lever are needle-shaped ends (18) (18').

These needle-shaped ends (18) (18') stand on the sawteeth parts (20) (20') in the upper parts of tape hubs (19) (19') built in the inside of the case in order to prevent the tape from being unwound when not in use.

In order to attain its purpose, the present invention extends a T-shaped brake lever (17) or separable brake levers (17a) (17a') and prevents the tape from being unwound by enabling the sawteeth parts (20) (20") to catch them (18) (18') facing toward the sawteeth parts (20) (20') to catch them (18) (18') but makes the positions of needle-shaped ends (18) (18') facing toward the sawteeth parts (20) (20') take their eccentric positions backward and inward contrary to the point where the former projections (25) (25') are located, as illustrated in FIG. 3 or FIG. 4.

As previously described, the slider (8) equipped with an integrated T-shaped brake lever (17) or separable brake levers (17a) (17a') has a wall (15) in the front and the free end of spring piece (16) supported in the lower half shell (3) is installed in the insider of frontal wall (15). In the initial stage, the slider (8) is located toward the frontal side, namely, toward the side of lead (4). Accordingly, the needle-shaped ends of brake lever (17) are separable brake levers (17) extended thereto in one united body catch the sawteeth parts (20) (20') of tape hubs.

As such tape hubs (19) (19') are unable to turn round in the direction to which the tape (T) is unwound, the tape is prevented from being wound when not in use.

Under such a condition, the tape (T) can be protected satisfactorily by reason that the hub holes (11) (11') of lower half shell (3) and the holes (12) (12') provided in the slider (8) do not correspond and the lead (4) cannot be opened to the slider (4).

However, when the tape cartridge is wholly inserted into the side of player (not illustrated), the slider (8) moves backward by means of usual means (refer to FIG. 6) and makes its holes (12) (12') correspond with the hub holes (11) (11') of lower half shell (3). At this time, hub brake is released as the spring piece (16) which elastically supports the frontal wall (15) is pressed still more and, at the same time, the needle-shaped ends (18) (18') of brake lever (17) or separable brake levers (17a) (17a') are divorced from the sawteeth parts (20) (20') of brake hubs (19) (19').

In FIG. 3, each needle-shaped end stands in a required position to keep the left tape hub (19) from rotating clockwise and right tape hub (19') from rotating counterclockwise.

In the inside of upper half shell (2) guide projection parts (21) (21') are formed to keep the said brake lever (17) from shaking when it moves.

The letterings (22) (22') which are not explained hereinabove indicate tape guides. These guides are also used as bosses for combination with screws. It is desirable that the positiveness and negativeness of screws are contrary to those used heretofore.

Those structures which are not related to the present invention are not described herein.

FIG. 4 illustrates another embodiment of the present invention. It enables the brake levers (17a) (17a') to fulfill the same function by being made to face toward the sawteeth parts (20) (20') of tape hubs (19) (19') from the side walls (9) (9') of slider (8).

Although it is thinkable that the brake lever (17) or (17a) (17a') in the two embodiments may touch the stacked layer of tape which is wound around the tape hubs (19) (19') and thereby do harm to it because its needle-shaped ends (18) (18') stand on the sawteeth parts (20) (20') of tape hubs (19) (19'), it is not necessary to worry about it because a thin sheet is inserted between the stacked layer of tape and the brake lever (17) or (17a) (17a').

Although the embodiments as described hereinbefore cover a digital signal-type audio tape cartridge, it is easy to apply it if it is the tape cartridge of this kind.

The present invention can expect more reliable motion than the prior method in which a separate hub brake member and its spring are used, because a brake lever is formed in the slider itself and united therewith and it moves together with the slider which moves forward and backward and it directly achieves the braking/debraking action of hub brake by moving together with the slider, but it has, among other things, the effect of reducing its cost price for mass production by being composed only of an upper half shell, a lead and a slider to the exclusion of a separation hub brake member and its expensive spring.

What is claimed is:

1. A tape cartridge comprising a case (1) having as inside; a slider (8) having a frontal wall (15) having a central upper part having a rear, a T-shaped brake lever (17) extending into the inside of the case (1) attached in the rear of the central upper part of the frontal wall (15) of the slider (8), the T-shaped brake lever (17) having two ends, both ends of this T-shaped brake lever (17) are needle-shaped ends (18) (18'), tape hubs (19) (19') having sawteeth parts (20) (20') respectively, and these needle-shaped ends (18) (18') being made to face toward the sawteeth parts (20) (20') of tape hubs (19) (19') respectively but to stand in a required position to keep each tape hub from rotating clockwise and counterclockwise, said tape cartridge and said case (1) united by an upper half shell (2) and a lower half shell (3), an opening/closing lead installed in front of the case and said slider united with the bottom of lower half shell, and in which the tape hubs built in the inside of the case are provided with the sawteeth parts (20) (20') respectively, and guide projection parts (21) (21') of the said brake lever (17) being formed inside the upper half shell (2) and wherein when the slider (8) and in turn the T-shaped brake lever (17) are in a first position, the tape hubs (19) (19') are prevented from rotating and when moved to a second position, the tape hubs (19) (19') are allowed to rotate.

2. A tape cartridge according to claim 1 in which the slider has an inside and sidewalls (9) (9') having two ends, the slider being provided with separable brake levers (17a) (17a') extending into the side from its side walls (9) (9') and both ends of these brake levers (17a) (17a') are needle-shaped ends (18) (18').

* * * * *